United States Patent [19]

Rupel et al.

[11] Patent Number: 5,357,605
[45] Date of Patent: Oct. 18, 1994

[54] METHOD AND SYSTEM FOR DISPLAYING PATTERNS USING A BITMAP DISPLAY

[75] Inventors: Wesley O. Rupel, Bellevue; Walter C. Moore, Seattle, both of Wash.

[73] Assignee: Microsoft Corporation, Redmond, Wash.

[21] Appl. No.: 601,939

[22] Filed: Oct. 23, 1990

Related U.S. Application Data

[63] Continuation of Ser. No. 244,449, Sep. 13, 1988, abandoned.

[51] Int. Cl.$^5$ ............................................. G06F 15/62
[52] U.S. Cl. ................................. 395/164; 395/129; 345/189; 345/187
[58] Field of Search ................ 364/518, 521; 340/799, 340/798, 747, 723, 703; 395/130, 129, 164, 166; 345/187, 186, 189, 190, 200, 203, 27

[56] References Cited

U.S. PATENT DOCUMENTS

| | | |
|---|---|---|
| 4,217,577 | 8/1980 | Roe et al. ............................ 340/703 |
| 4,308,532 | 12/1981 | Murphy ............................... 340/723 |
| 4,330,834 | 5/1982 | Murphy ............................... 364/521 |
| 4,622,546 | 11/1986 | Sfarti et al. ......................... 340/748 |
| 4,646,078 | 2/1987 | Knierim et al. ..................... 340/750 |
| 4,701,864 | 10/1987 | Takashima et al. ................. 340/799 |
| 4,706,079 | 11/1987 | Kummer et al. .................... 340/799 |

Primary Examiner—Raymond J. Bayerl
Attorney, Agent, or Firm—Seed and Berry

[57] ABSTRACT

A method and system of displaying a pattern using a bitmap memory display which acomplishes an overall pattern display by writing to the display memory one copy of the pattern. The logical unit (LU) of the system's graphics adapter (GA) is then used to replicate the pattern throughout the bitmap memory with a reduced number of write operations from the central processing unit (CPU) to the GA.

10 Claims, 5 Drawing Sheets

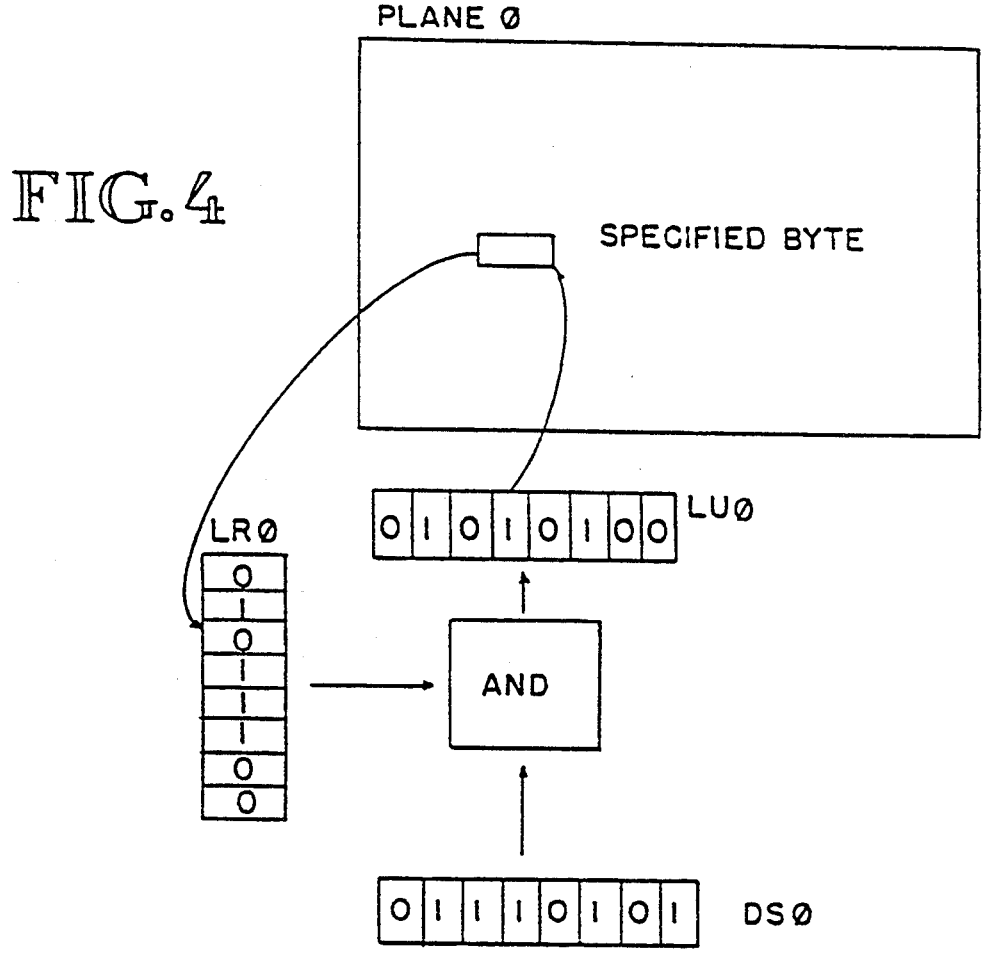

FIG 6

| Column 0 | 1 | 5X 2 | 3 | 4 | Plane 0 |
|---|---|---|---|---|---|
| 0  01001101 | 01001101 | 01001101 | 01001101 | 01001101 | |
| 1  10110010 | 10110010 | 10110010 | 10110010 | 10110010 | |
| 2  10101010 | 10101010 | 10101010 | 10101010 | 10101010 | |

1 { ... ⋮ ...

| 01010101 | 01010101 | 01010101 | 01010101 | 01010101 |
| 11110000 | 11110000 | 11110000 | 11110000 | 11110000 | scan lines−1  00101010 00101010 00101010 00101010 00101010
scan lines    01001101 01001011                 01001011
scan lines+1  10110010
              10101010

2 { ... ⋮ ... scan lines 00101010                         00101010
scan lines    01001101 01001101                01001101
              10110010

3 { ... ⋮ ...

11110000                         11110000
scan lines−1  00101010 00101010                00101010

METHOD AND SYSTEM FOR DISPLAYING PATTERNS USING A BITMAP DISPLAY

This application is a continuation of U.S. application Ser. No. 07/244,449 filed Sept. 13, 1988, now abandoned.

TECHNICAL FIELD

This invention relates generally to a computer system for displaying information on a bitmap display and more specifically a method and apparatus for efficiently displaying patterns on a computer system.

BACKGROUND ART

The output devices of a personal computer often include a graphics adapter and a monochrome display. The graphics adapter (GA) contains a bitmap memory that is accessible by the computer's central processing unit (CPU) and the GA's CPU. Each bit in the bitmap memory corresponds to one pixel on the display screen. To display data, the GA CPU reads the bitmap memory. If a bit is 1 then the GA turns the corresponding pixel on. If a bit is 0 then the GA turns the corresponding pixel off. By changing the contents of the bitmap memory, a computer program can effect a change on the display screen.

To accommodate color displays the GA needs to be more sophisticated. A single bit in bitmap memory per screen pixel is not sufficient to represent more than two colors. If four colors are to be displayed, then two bits per pixel are needed; if eight colors are to be displayed, then three bits per pixel are needed; if sixteen colors are to be displayed, then four bits per pixel are needed; and so on. Each bit per pixel is conceptually considered to be in a separate plane, with a one bit per pixel bitmap maintained for each plane. FIG. 1 illustrates a bitmap with four planes. The GA CPU will read the 4 bits for each pixel from each of the four planes and turn the appropriate color on for that pixel on the screen.

The GA bitmap memory, is typically an 8-bit byte (a byte is a sequence of adjacent binary digits operated upon as a unit in a computer); that is, eight bits can be written to the bitmap memory at a time. To fill an entire bitmap memory in a conventional computer system, the computer CPU would generally for each plane write each byte. Thus, the total number of bytes written to the GA in a conventional system is the number of planes times the number of bytes per scan line times the number of scan lines. Such an arrangement is considered undesirable because write operations from the computer CPU to the GA are relatively time intensive, and require valuable CPU time that could be better spent on other operations.

DISCLOSURE OF THE INVENTION

It is an object of the present invention to provide a method and system of efficiently displaying patterns using a bitmap memory.

It is another object of the present invention to provide such a method and system that will reduce the number of times a computer's CPU must write to the GA to effect the display of the desired pattern.

These and other objects, which will become apparent as the invention is more fully described below, are obtained by providing an improved method and system of pattern displays. In a preferred embodiment, a system according to the present invention accomplishes an overall pattern display by writing to the display memory one copy of the pattern. The logical unit (LU) of the GA is then used to replicate the pattern throughout the bitmap memory with a reduced number of write operations from the CPU to the GA.

BRIEF DESCRIPTION OF THE DRAWINGS

FIG. 4 illustrates a typical use of the LUs.
FIG. 6 illustrates an area of the bitmap memory after filled in with the pattern.

DETAILED DESCRIPTION OF THE INVENTION

A preferred embodiment of the present invention is described below as implemented on an IBM PC or compatible computer including a typical graphics adapter (GA). To facilitate an understanding of this embodiment, the following section describes the operation of a typical GA in a personal computer system.

GRAPHICS ADAPTER

A typical color graphics adapter (GA) displays information in color based on four planes (Plane 0–Plane3) of a bitmap memory. Thus, one of sixteen colors can be displayed at each screen pixel. The GA provides several functions that allow the GA to process a byte of information that has been sent to it by the computer CPU. While the GA is processing such a byte, the computer CPU is free to execute its own instructions. This is in effect parallel processing. The GA performs several complex graphics functions that can significantly increase the speed of processing graphics information.

Figure 2:
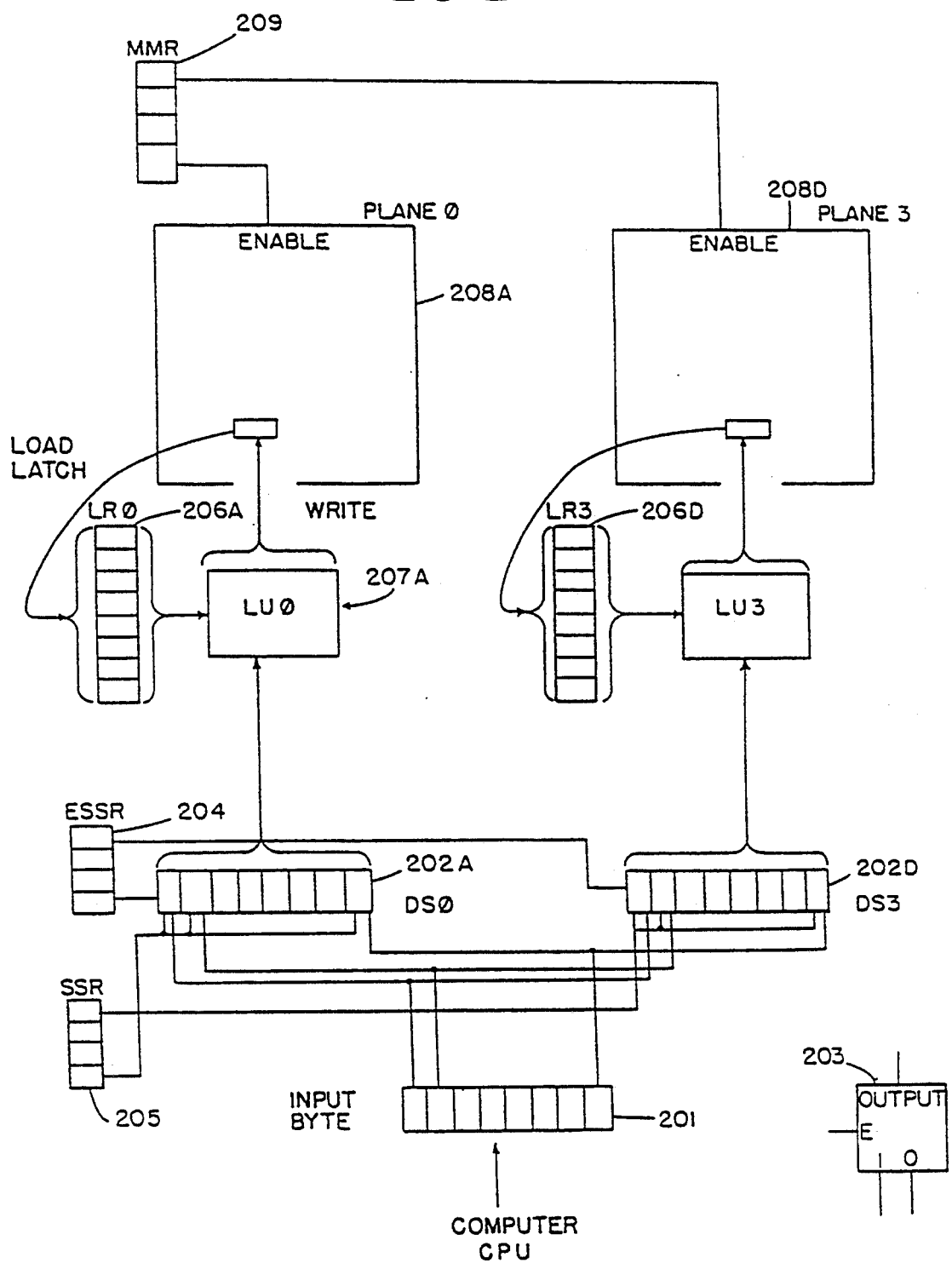
FIG. 2 is a schematic of a graphics adapter.

FIG. 2 is a schematic of a typical GA. (Typical GAs include IBM's Color Graphics Adapter and Enhanced Graphics Adapter). Only one byte (201) of information is transferred from the computer CPU to the GA at a time. The GA logically contains four banks of eight data selectors (DS0–DS3) (202A–202D), corresponding to one bank for each plane. Bit 0 of DS0 is referred to DS0[0]; bit 1 of DS0 is referred to as DS0[1]; and so on. A data selector (203) is a logical element with three inputs and one output. If a logical one is applied to the enable input (E) then the DS selects the 1-input to output. If a logical zero is applied to the enable input the DS selects the 0-input to output.

The GA contains a Set/Reset Register (SRR) (205) and an Enable Set/Reset Register (ESRR) (204). Both registers are 4 bits wide. Each bit corresponds to one of the four planes. These registers are loaded from the computer CPU.

The SRR, the ESRR, and the input byte are inputs for the DSs. The ESRR is logically connected to the enable inputs of the DSs. Bit 0 of the ESRR is logically connected to each enable input of DS0. (202A); bit 1 of the ESRR is logically connected to each enable input of DS1 (202B); and so on for DS2 and DS3. The SRR is logically connected of the 1-inputs of the DSs. Bit 0 of the SRR is logically connected to each 1-input of DS0 (202A); bit 1 of the SRR is logically connected to each 1-input of DS1 (202B); and so on for DS2 and DS3. The input byte (201) is logically connected to the 0-input of each DS. Bit 0 of the input byte is logically connected to the 0-input of DS0[0], DSI[0], DS2[0], and DS3[0]; bit 1 of the input byte is logically connected to the 0-input of DSI[1], DSI[1], DS2[1], and DS3[1]; and so on for the other six bits of DS0–DS4.

The GA contains four eight-bit latch registers (LR0–LR3) (206A–206D). Each latch register corresponds to one of the four planes. The computer CPU can instruct the GA to load the LRs registers with one byte of data from a location in the corresponding plane of the bitmap memory.

The GA contains four logical units (LU0–LU3) (207A–207D). Each logical unit corresponds to one of the four planes. The LUs perform logical operations (e.g., AND, OR, XOR, and data selection) on the outputs from the DSs and the LRs. The computer CPU can select the logical operation to perform.

The GA contains four display memory planes (Plane0–Plane3) (208A–208D). The GA writes the output of the LUs to a specified location in the corresponding plane that has its enable input set to 1. The GA contains an 4-bit Memory Mask Register (MMR) (209). Each bit corresponds to a plane. The MMR is logically connected to the enable input of the planes. Bit 0 of the MMR (MMR[0]) is logically connected to the enable input of Plane0; bit 1 of the MMR (MMR[1]) is logically connected to the enable input of Plane 1; and so on the other two planes.

Figure 1:
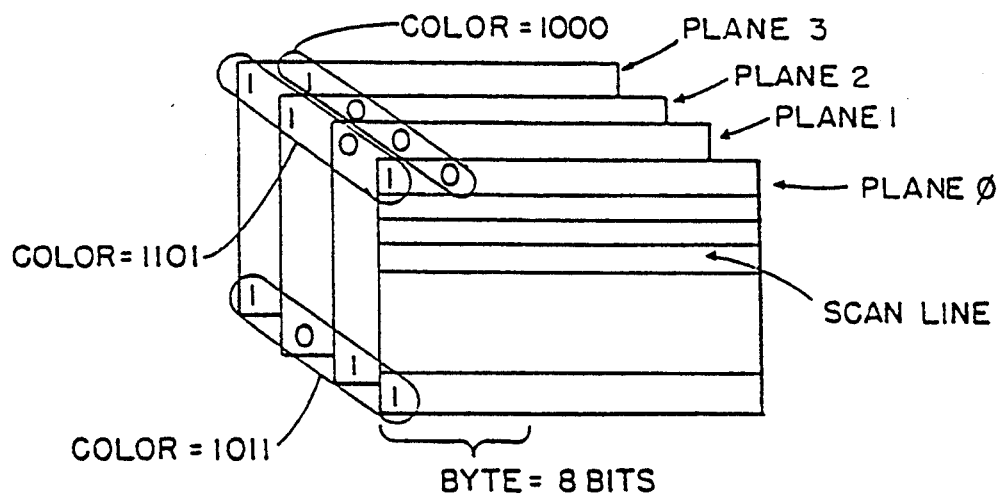
FIG. 1 illustrates a bitmap memory with four planes.
Figure 3:
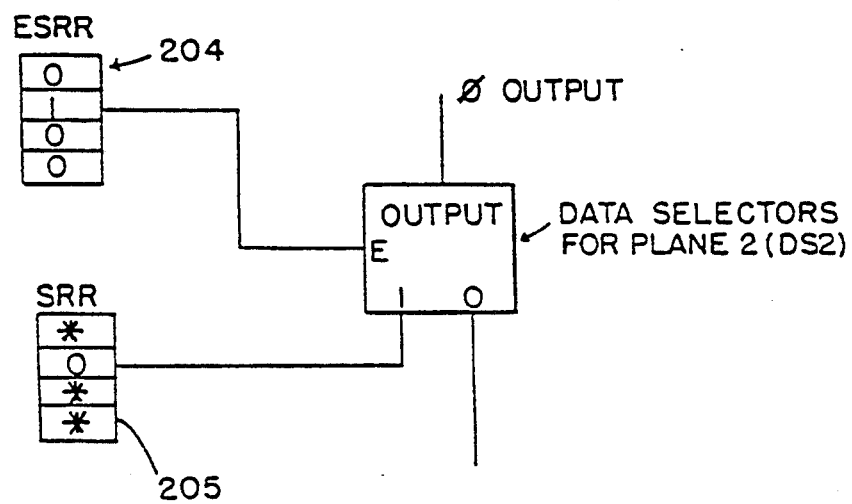
FIG. 3 illustrates the ESRR and SRR.

In operation, the SRR and the ESRR are used to force the output of each bit in a DS to a 0 or 1. FIG. 3 illustrates the ESRR loaded ("0100") to select, Plane2 and the SRR loaded ("*0**") to force the output of each bit of DS2 to a 0. The asterisks (205) indicate that the contents do not matter (i.e., don't care) because the corresponding DS selects the data from the input byte and not from the SRR.

In operation, the LRs and LUs are used to update the current content of bitmap memory byte. Typically, the computer CPU directs the GA to select a logical operation and to load the LRs from a specified bitmap memory byte. The computer CPU then sends an input byte to the GA. The GA performs the logical operation on the output of the LRs and the DSs. The GA updates the specified bitmap memory, byte. FIG. 4 illustrates the performing of a logical AND operation. The computer CPU directs the LUs to perform the AND function. The computer CPU then directs the loading of the LRs from a specified byte in the bitmap memory. The LR0 of FIG. 4 has been loaded with "01011100" from the bitmap memory. The computer CPU then directs the loading of the input byte, which is illustrated as a "01110101", which depending upon the ESRR and SRR contents, is output on DS0. The GA updates the specified byte with the output of LU0, which is the logical AND of LR0 and DS0 ("01010100"). All four planes can be updated depending on the contents of the MMR.

PATTERN FILL

In accordance with the method of the present invention, a system comprising a preferred embodiment fills an area of the bitmap memory with a pattern. A particular display is designated as a pattern and processed accordingly. The pattern is one byte wide by a variable number of scan lines. In a four plane bitmap memory, each pixel of the pattern can be any one of sixteen colors.

Figure 5:
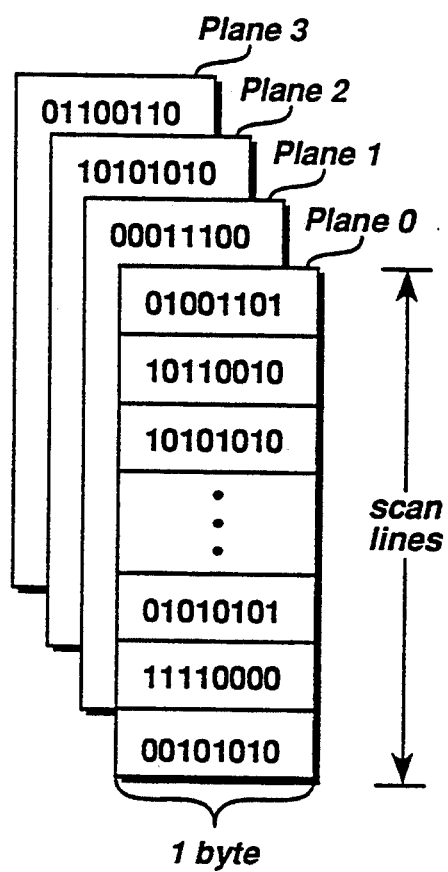
FIG. 5 illustrates a sample pattern.

FIG. 5 illustrates a sample pattern. The pattern consist of four planes by one byte by a specified number of scan lines.

FIG. 6 illustrates the contents of an area of plane0 of the bitmap memory after the system has replicated the sample pattern in an area of five bytes by three times the number of scan lines. The system also replicates plane1 through plane3 of the pattern onto plane1 through plane3 of the bitmap memory (not shown).

The system replicates the pattern by first writing to the bitmap memory one copy of the pattern. In accordance with the preferred method, the pattern is written starting at the first byte of the destination area. In FIG. 6 that area is indicated as column[0] of row[0] through row[scan lines−1]. All four planes of the pattern are filled in. In an alternative embodiment, the GA may support the direct loading of the LRs from the CPU. Such support would make unnecessary this first step of replicating because its purpose is to load the LRs.

The system then uses a function of the LUs that causes the output of the LUs to be selected from the LRs. This is accomplished by setting a Bit Mask Register (BMR) on some GAs. The BMR is set to "11111111." On the IBM EGA, however, this setting would be "00000000" because a 0-setting selects the LRs.

The system loads the byte at row[0] of column[0] for all four planes into the LRs. The system sets to MMR to "1111" to enable all four planes. The computer CPU then executes a write to each column of row[0]. In this preferred embodiment, the "rep stosb" instructions can be used to effect the move. Since the LRs holds the first byte of the pattern, the system then writes to each column of row[scan lines], then to each column of row[2 * scan lines], and so on. The effect is to replicate the first byte of the pattern to all appropriate locations in the bitmap memory.

The system then loads the byte at row[1] of column[0] for all four planes into the LRs. The computer CPU then executes a write to each column of row[1], then to each column of row[scan lines+1], then to each column of row[2 * scan lines+1], and so on.

The system repeats this process for each byte in the pattern to complete the pattern display.

The visual effect of updating the bitmap memory in this manner is a "Venetian blind" effect. As each successive byte of the pattern is moved to the bitmap memory, the pattern is filled in from top to bottom.

Although the present invention has been described in terms of a preferred embodiment, it is not intended that the invention be limited to this embodiment. Modifications within the spirit of the invention will be apparent to those skilled in the art. The scope of the present invention is defined by the claims which follow.

We claim:

1. A method in a computer system of filling a selected area of a bitmap memory with a specified bit pattern, the bitmap memory being logically divided into rows and columns of bits, each row being logically divided into a plurality of bytes, each byte being a sequence of a specified number of adjacent bits, the computer system having a computer memory containing the bit pattern, the bit pattern having a specified number of columns and a specified number of rows, the specified number of columns being equal to the number of bits in a byte, each column being one bit wide, each row being one bit high, the bitmap memory having an associated latch register, the latch register having a specified number of bits that is equal to the number of bits in a byte, the latch register capable of receiving data from the bitmap memory, the bitmap memory capable of receiving data from the latch register and from the computer memory, the method comprising the steps of:
  a. reading the bit pattern from the computer memory and storing an occurrence of the bit pattern in the bitmap memory;
  b. loading into the latch register the bit values that comprise the first row of the bit pattern from the occurrence of the bit pattern stored in the bitmap memory;
  c. determining each row in the selected area of the bitmap memory into which the first row of bit pattern is to be replicated;
  d. for each determined row, repeatedly writing the bit values of the latch register as loaded in step b to each byte in the row to effect the filling of each column of the bitmap memory in the determined rows; and
  e. repeating steps b through d for the second and any succeeding rows in the bit pattern to complete the filling of the selected area of the bitmap memory with the bit pattern.

2. The method of claim 1 wherein the bitmap memory has multiple planes wherein each step of loading into the latch register loads the bits from at least two planes simultaneously, and wherein each step of writing the bit values of the latch register writes to at least two planes simultaneously.

3. A method of replicating a pattern in a selected area of a bitmap memory, the bitmap memory having a latch register, the pattern having one column and a plurality of rows of data, the selected area having a plurality of columns and rows, the latch register being one column wide, a column being a plurality of bits wide, the method comprising the steps of:
  a. loading the latch register with the data from the first row of the pattern;
  b. determining the rows in the selected area into which the data in the first row of the pattern is to be replicated;
  c. writing the data in the latch register as loaded in step a to each column in each determined row without reloading the latch register; and
  d. repeating steps a through c for the second and succeeding rows in the pattern to effect the replication of the pattern throughout the selected area of the bitmap memory.

4. The method of claim 3 wherein the bitmap memory is the memory of the Enhanced Graphics Adapter.

5. The method of claim 3, including the step of before loading the latch register, loading into the selected area of the bitmap memory an occurrence of the pattern wherein the step of loading the latch register retrieves the data in the first row from the occurrence of the pattern.

6. The method of claim 3 wherein the bitmap memory is operatively connected to a computer, the computer having a repeat instruction and a store string byte instruction, and wherein the step of writing the data includes the execution of the repeat store string byte ("rep stosb") instruction to effect the writing of the data to each column in each determined row.

7. A method of replicating a pattern in a selected area of a multiplane bitmap memory, the bitmap memory having a latch register associated with each plane, the pattern having one column, a plurality of rows, and a plurality of planes of data, the selected area having a plurality of columns, rows, and planes, the latch registers being one column wide, a column being a plurality of bits wide, the method comprising the steps of:
  a. for each plane in the pattern, loading the associated latch register with data from the first row of the pattern;
  b. determining the rows in the selected area into which the data in the first row of the pattern is to be replicated;
  c. simultaneously writing to the associated planes the data in the latch registers as loaded in step a to each column in each determined row without reloading the latch registers; and
  d. repeating steps a through c for the second and succeeding rows in the pattern to effect the replication of the pattern throughout the selected area of the multiplane bitmap memory.

8. The method of claim 7 wherein the multiplane bitmap memory is the memory of the Enhanced Graphics Adapter.

9. The method of claim 7, including the step of before loading the associated latch registers, loading into the selected area of the bitmap memory an occurrence of the pattern wherein the step of loading the associated latch registers retrieves the data in the first row from the occurrence of the pattern.

10. The method of claim 7 wherein the multiplane bitmap memory is operatively connected to a computer, the computer having a repeat instruction and a store string byte instruction, and wherein the step of writing the data includes the execution of the repeat store erring byte ("rep stosb") instruction to effect the writing of the data to each column in each determined row for each plane.

* * * * *